United States Patent [19]

Nefzger et al.

[11] Patent Number: 5,770,671

[45] Date of Patent: Jun. 23, 1998

[54] PROCESS FOR POLYMERIZING ISOCYANATES

[75] Inventors: Hartmut Nefzger, New Martinsville, W. Va.; Bernd Quiring, Leverkusen, Germany

[73] Assignee: Bayer Aktiengesellschaft, Leverkusen, Germany

[21] Appl. No.: 905,256

[22] Filed: Aug. 1, 1997

[30] Foreign Application Priority Data

Aug. 7, 1996 [DE] Germany ............ 196 31 859.9

[51] Int. Cl.$^6$ ..................................... C08G 18/22
[52] U.S. Cl. ........................... 528/56; 528/73
[58] Field of Search ..................... 528/56, 73

[56] References Cited

U.S. PATENT DOCUMENTS 4,861,806  8/1989  Rembold et al. .............. 522/66
5,102,918  4/1992  Moriya ........................ 521/110

OTHER PUBLICATIONS

Ullmanns Encyklopädie der technischen Chemie, 4, Aufl., Bd. 16, (month unavailable) 1978, pp. 598–604.

*Primary Examiner*—Rachel Gorr
*Attorney, Agent, or Firm*—Joseph C. Gil; Noland J. Cheung

[57] ABSTRACT

Isocyanates are polymerized in a simple manner by polymerizing aliphatic and/or aromatic isocyanates in the presence of metallocenes at temperatures from 20° to 220° C., optionally subject to increased or reduced pressure and optionally in the presence of an inert organic solvent, the metallocene being used in an amount of 5 to 50,000 ppm relative to the amount of isocyanates used.

6 Claims, No Drawings

PROCESS FOR POLYMERIZING ISOCYANATES

BACKGROUND OF THE INVENTION

The present invention relates to a process for polymerizing isocyanates in the presence of metallocene catalysts.

It is known how to polyrmerize isocyanates and such methods are described, e.g. in the Kunststoff-Handbuch, Volume 7 (Polyurethane), 3rd edition, p.14ff, published by Carl-Hanser-Verlag, Munich, Vienna in 1993. In this connection, the trimerization of isocyanates to form isocyanurates is of special technical interest, since the latter are also highly stable at elevated temperatures. With this process, the isocyanates are polymerized or trimerized, inter alia, in the presence of strong bases such as alkali acetates or alkali formates. If isocyanates are polymerized using strong bases by way of catalysts, it is disadvantageous in that this may, in particular, cause chemical degradation of the plastics. It is known, e.g. that urethane, urea and ester groups are subject to hydrolytic degradation, if use is made of alkalis by means of catalysts.

SUMMARY OF THE INVENTION

The present invention provides a process for polymerizing isocyanates, comprising the step of polymerizing aliphatic and/or aromatic isocyanates in the presence of metallocenes having the general formula:

$$ML_2$$

wherein

M represents nickel or cobalt and

L represents a cyclopentadienyl, indenyl, naphthalene or benzene residue optionally substituted individually or in a multiple manner and whereby, the ligands L may be bridged by one or more hydrocarbon bridges with 2 to 4 carbon atoms at temperatures between 20° and 220° C., optionally subject to increased or reduced pressure and optionally in the presence of an inert organic solvent, the metallocenes being used in an amount of 5 to 50,000 ppm relative to the amounts of isocyanates used.

It is therefore the object of the present invention to avoid the aforementioned disadvantages associated with the polymerization of isocyanates and to provide a process, which, in technical respects, is particularly advantageous, with a view to producing PUR plastics comprising proportions of polymeric isocyanates.

DETAILED DESCRIPTION OF THE INVENTION

The ligands L corresponding to the general formula $ML_2$ can, in particular, be substituted by $C_1$–$C_5$ alkyl residues, preferably methyl residues. If the ligands L are bridged by hydrocarbon bridges, simple bridging with hydrocarbon bridges having two carbon atoms is preferred. In the formula $ML_2$, the preferred metal M is cobalt or nickel, in particular cobalt, while the preferred ligand L is cyclopentadienyl residue.

The process according to the present invention is preferably carried out at temperatures between 20° and 200° C. Depending on the boiling points of the isocyanates used, it may be advantageous to operate under pressure (up to 200 bar) and, optionally, subject to a partial vacuum (>0.01 mbar).

Depending on the mode of operation selected, it may, in addition, be advantageous for the process to proceed in the presence of an inert organic solvent such as (cyclo)aliphatic, araliphatic, aromatic hydro-carbons, ethers, esters and/or oligoethers/polyethers or oligoesters/ polyesters. By way of solvents, use is made, in particular, of the following substances: hexane, cyclohexane, tetraethyleneglycol dimethylether, toluene and acetic acid. The optimal amount of solvent used, can be readily determined by carrying out appropriate preliminary tests.

With a process according to the present invention, the metallocenes which correspond to the aforementioned formula, are preferably used in a ratio of 10 to 10,000 ppm, and more preferably, between 50 to 5,000 ppm, relative to the amount of isocyanates used.

With the process according to the present invention, any conventional isocyanates can be used by way of aliphatic and/or aromatic isocyanates. In this connection, we would refer, in particular, to W. Siefken, Justus Liebigs Annalen der Chemie 562, 75–136 (1949). By way of aliphatic and/or aromatic isocyanates, the following are examples of isocyanates, which are suitable for the process according to the present invention: butylene diisocyanate, isophorone diisocyanate, hexamethylene diisocyanate, cyclohexane-1, 4-diisocyanate, hydrated toluylene diisocyanates, dicyclohexylmethane diisocyanate, phenylene diisocyanate, 2,4- and 2,6-totuylene diisocyanate, phenyl isocyanate, isocyanates pertaining to the diphenylmethane series, 1,5-naphthalene diisocyanate, p-chlorophenyl isocyanate, triisopropylphenylene diisocyanate containing carbodiimidized groups, preferably isocyanates pertaining to the diphenylmethane series, 2,4- and 2,6-toluylene diisocyanate, 1,5-naphthalene diisocyanate, 1,4-phenylene diisocyanate and prepolymers or semiprepolymers with terminal NCO groups produced therefrom.

The process according to the present invention is generally implemented by presenting the isocyanates to be polymerized, optionally in the presence of a suitable inert organic solvent, whereupon the metallocene catalysts are added in the pure state or optionally, dissolved in an appropriate inert organic solvent to the isocyanates to be polymerized subject to intensive mixing.

With the process according to the present invention, it is possible to polymerize the isocyanates quantitatively in a minimum of time or to trimerize them to form stable isocyanurates, it being possible, if required, to interrupt the polymerizing or trimerizing reaction.

The invention is further illustrated, but is not intended to be limited by the following examples, in which, all parts and percentages are by weight unless otherwise specified.

EXAMPLES

Example 1

Tests with MDI prepolymers

A semipolymer with terminal NCO (theoret. NCO value: 3.17 wt.-% NCO) obtained from a polyethylene adipate (Desmophen 2000®, hydroxyl number 56) and 4,4'-diphenylmethane diisocyanate (Desmodur 44®, MDI) was mixed at 80° C. with the amounts listed in Table 1 of a previously prepared cobaltocene (dicyclopentadienylcobalt) solution (cyclohexane) and polymerized at 80° C.

Table 1 states the reaction time required for solidification; if only 50 ppm cobaltocene were added (Example 1.c.) the viscosity was increased, whereas in the comparison test (Example 1.d.) the viscosity remained virtually unchanged.

TABLE 1

Examples (1.a., 1.b., 1.c.) of polymerization of MDI prepolymer applying different concentrations of cobaltocene (dissolved in cyclohexane); reaction temperature: 80° C.

| Ex. | Metallocene | Concentration [ppm] | Reaction time | Characteristics | Note |
|---|---|---|---|---|---|
| 1.a. | CoCp$_2$*) | 500 | 1 h | solidified | |
| 1.b. | CoCp$_2$*) | 100 | 8 h | solidified | |
| 1.c. | CoCp$_2$*) | 50 | >24 h | highly viscous | |
| 1.d. | CoCp$_2$*) | 0 | >24 h | viscous | comparative test |

*): cobaltocene, dicyclopentadienylcobalt

On the basis of solubility or insolubility in DMSO (dimethyl sulfoxide), the examples listed in Table 2 show that with cobaltocene, catalysis cross-linking occurs, whereas the catalyst octasoligen-cobalt gives rise to products which are soluble and therefore, largely free from cross-linking.

TABLE 2

Tests with the polymerization of MDI prepolymers (NCO content: 3.17 wt.-%) using catalysts of various types; reaction temperature: 80° C. The catalysts were dissolved in tetraethyleneglycol dimethylether. Example 1.f.: comparative test (not according to the present invention).

| Ex. | Catalyst | Concentration [ppm] | Reaction time [h]/Observation | Reaction time [h]/Observation | Solubility in DMSO***) |
|---|---|---|---|---|---|
| 1.e. | CoCp$_2$*) | 100 | 3/ very high viscosity | 5/ solid | insoluble/ strong swelling |
| 1.f. | octasoligen-Co**) | 100 | 3/ very high viscosity | 5/ solid | soluble |

*): cobaltocene, dicyclopentadienylcobalt
**): cobaltoctanoate
***): dimethylsulfoxide

Example 2

Tests with NDI (Desmodur 15®, naphthylene-1,5-diisocyanate) prepolymers

A prepolymer was prepared from a polyethylene adipate (Desmophen 2000®, hydroxyl number 56) and from Desmodur 15® (identification number 190, NCO$_{theoret.}$: 3.17 wt.%) at about 120° C., and said prepolymer was mixed with the amounts of cobaltocene solution (cyclohexane or tetraethyleneglycol dimethyl-ether) listed in Table 3 and polymerized.

TABLE 3

Tests with respect to the polymerization of NDI prepolymers subject to the addition of cobaltocene in different concentrations and different modes of application as well as without any additional cobaltocene; reaction temperature: 120° C.

| Metallocene | Concentration [ppm] | Solvent | Reaction Time (h = hours) | Characteristics | Notes |
|---|---|---|---|---|---|
| CoCp$_2$*) | 500 | Cyclo-hexane | 1 h | solidified | DMSO**) insoluble |
| CoCp$_2$*) | 100 | Cyclo-hexane | <8 h | solidified | DMSO insoluble |
| CoCp$_2$*) | 50 | Cyclohexane | <8 h | solidified | DMSO insoluble |
| | | | <8 h | solidified | Comp. test DMSO soluble |
| CoCp$_2$*) | 500 | TEGDME®***) | 0.3 h | solidified | DMSO insoluble |
| CoCp$_2$*) | 100 | TEGDME®***) | <8 h | solidified | DMSO insoluble |
| COCp$_2$*) | 50 | TEGDME®***) | <8 h | solidified | DMSO insoluble |
| | | | <8 h | solidified | Comp. test DMSO soluble |

*): cobaltocene, dicyclopentadienylcobalt
**): DMSO: dimethylsulfoxide
***): tetraethyleneglycol dimethylether

Example 3

Tests using p-tolylisocyanate:

Freshly distilled p-tolylisocyanate was mixed with the given metallocene in a glass flask under nitrogen while stirring, whereupon the glass flask was sealed and heated to the reaction temperature of 50° C. Samples were taken after various reaction times and IR spectra were plotted. In Table 4, the conversion is said to be "quantitative" if it was no longer possible to identify the NCO absorption bands.

TABLE 4

Tests with respect to the polymerization of p-tolylisocyanate in the presence of cobaltocene and nickelocene in different concentrations; reaction temperature: 25° C.; comparative test using octasoligen-cobalt.

| Metallocene/ catalyst | Concentration [ppm] | Reaction time | Conversion |
|---|---|---|---|
| CoCp$_2$*) | 10,000 | 1 sec | quantitative |
| CoCp$_2$*) | 500 | 10 min | quantitative |
| CoCp$_2$*) | 100 | 30 min | quantitative |
| CoCp$_2$*) | 50 | about 4 h | quantitative |
| octasoligen-Co**) | 1,000 | 24 h | no |
| NiCp$_2$***) | 10,000 | 10 h | quantitative |

*): Use was made of cobaltocene (dicyclopentadienylcobalt) by way of a 1% cyclohexane solution: later tests showed that e.g. tetraethyleneglycol dimethylether is clearly more suitable as a solvent.
**): cobaltoctanoate
***): nickelocene, dicyclopentadienylnickel Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for polymerizing isocyanates, comprising the step of polymerizing aliphatic and/or aromatic isocyanates in the presence of metallocenes having the general formula

ML$_2$ wherein

M represents nickel or cobalt and

L represents a cyclopentadienyl, indenyl, naphthalene or benzene residue optionally substituted individually or in a multiple manner and whereby, the ligands L may be bridged by one or more hydrocarbon bridges with 2 to 4 carbon atoms at temperatures between 20° and 220° C., optionally subject to increased or reduced pressure and optionally, in the presence of an inert organic solvent, the metallocenes being used in an amount of 5 to 50,000 ppm relative to the amounts of isocyanates used.

2. A process according to claim 1, wherein the metallocenes used is dicyclopentadienylcobalt.

3. A process according to claim 1, wherein the metallocenes used is dicyclopentadienylnickel.

4. A process according to claim 1, wherein the metallocenes used are dicyclopentadienylcobalt and dicyclopentadienylnickel.

5. A process according to claim 1, wherein the process is carried out at temperatures from 20° to 200° C.

6. A process according to claim 1, wherein the metallocenes are used in an amount of 10 to 10,000 ppm relative to isocyanates used.

* * * * *